(12) United States Patent
Meiffre et al.

(10) Patent No.: US 11,111,943 B2
(45) Date of Patent: Sep. 7, 2021

(54) GROOVED NUT FOR BLIND FASTENING, RIVET AND ASSEMBLY COMPRISING SUCH A NUT

(71) Applicant: LISI AEROSPACE, Paris (FR)

(72) Inventors: Loic Meiffre, Conflans Ste-Honorine (FR); Guy Pailhories, Villefranche de Rouergue (FR); Christophe Vandaele, le Bouscat (FR)

(73) Assignee: LISI AEROSPACE, Paris (FR)

( * ) Notice: Subject to any disclaimer, the term of this patent is extended or adjusted under 35 U.S.C. 154(b) by 142 days.

(21) Appl. No.: 16/159,551

(22) Filed: Oct. 12, 2018

(65) Prior Publication Data

US 2019/0113063 A1 Apr. 18, 2019

(30) Foreign Application Priority Data

Oct. 13, 2017 (FR) ...................................... 1759596

(51) Int. Cl.
*F16B 19/10* (2006.01)
*F16B 33/00* (2006.01)
(Continued)

(52) U.S. Cl.
CPC ............ *F16B 19/1072* (2013.01); *F16B 5/04* (2013.01); *F16B 33/002* (2013.01); *F16B 37/067* (2013.01); *F16B 19/10* (2013.01)

(58) Field of Classification Search
CPC ...... F16B 5/04; F16B 13/066; F16B 19/1045; F16B 19/1072; F16B 33/002; F16B 37/067; F16B 19/10
(Continued)

(56) References Cited

U.S. PATENT DOCUMENTS 3,279,303 A * 10/1966 Shackelford .......... F16B 37/067
411/49
3,369,289 A * 2/1968 Gapp .................. F16B 19/1054
29/512
(Continued)

FOREIGN PATENT DOCUMENTS

DE     60308278     4/2007
EP     0595041      5/1994
(Continued)

OTHER PUBLICATIONS

Fritzen, Claas, Preliminary Search Report, dated Jun. 4, 2018, 2 pages, National Institute of Industrial Property, France.
(Continued)

*Primary Examiner* — Roberta S Delisle
(74) *Attorney, Agent, or Firm* — Henricks Slavin LLP

(57) ABSTRACT

A nut (32) for assembling elements of a structure comprises a collar (64) capable of coming into contact with a front face of the structure; a tightening zone having an outer diameter (86) capable of being inserted into a hole of the structure; a deformation zone adjacent to the tightening zone and capable of forming a bulge against a rear face of the structure, opposite the front face; and a tapped portion (65) adjacent to the deformation zone.

The nut may include grooving (82) on an outer circumference of at least one part of the deformation zone, a maximum diameter of said grooving (82) being less than or equal to the outer diameter (86) of the tightening zone.

12 Claims, 2 Drawing Sheets

(51) Int. Cl.
*F16B 5/04* (2006.01)
*F16B 37/06* (2006.01)

(58) Field of Classification Search
USPC ............ 411/34, 38, 44, 51, 70, 73, 80.1
See application file for complete search history.

(56) References Cited

U.S. PATENT DOCUMENTS

| | | | | |
|---|---|---|---|---|
| 4,702,655 | A * | 10/1987 | Kendall | F16B 19/1054 |
| | | | | 29/523 |
| 6,224,309 | B1 * | 5/2001 | Yamamoto | F16B 19/1072 |
| | | | | 411/11 |
| 9,366,283 | B2 * | 6/2016 | Boerner | F16B 37/067 |
| 2003/0123949 | A1 * | 7/2003 | Eshraghi | F16B 19/1045 |
| | | | | 411/71 |
| 2004/0226159 | A1 * | 11/2004 | Harlow | F16B 37/067 |
| | | | | 29/525.01 |
| 2005/0180841 | A1 * | 8/2005 | Cao | F16B 37/067 |
| | | | | 411/501 |
| 2008/0193256 | A1 * | 8/2008 | Neri | F16B 37/067 |
| | | | | 411/437 |
| 2011/0311334 | A1 * | 12/2011 | Makino | C23C 8/22 |
| | | | | 411/427 |
| 2014/0314516 | A1 * | 10/2014 | Bowers | F16B 37/067 |
| | | | | 411/344 |
| 2015/0240854 | A1 * | 8/2015 | Scholefield | F16B 5/0275 |
| | | | | 411/43 |

FOREIGN PATENT DOCUMENTS

| | | |
|---|---|---|
| EP | 0691480 | 1/1996 |
| EP | 0945631 | 9/1999 |
| FR | 2515283 | 4/1983 |
| FR | 3016417 | 7/2015 |
| WO | WO 2019073076 | 4/1919 |

OTHER PUBLICATIONS

Fritzen, Claas, International Search Report, dated Dec. 20, 2018, 6 pages, European Patent Office, Rijswijk, Netherlands.

Fritzen, Claas, Written Opinion, dated Apr. 14, 2020, 6 pages, European Patent Office, Munich, Germany.

Technical Product Documentation—Dimensioning and Indication of Knurling, ISO 13444, Aug. 1, 2012, 8 pages, International Organization for Standardization, Geneva, Switzerland.

Knurls, DIN 82, Jan. 1973, 4 pages, Beuth-Vertrieb GmbH, Berlin, Germany.

* cited by examiner

GROOVED NUT FOR BLIND FASTENING, RIVET AND ASSEMBLY COMPRISING SUCH A NUT

The present invention relates to blind fastenings. More specifically, the invention relates to a nut, which may also be considered a tapped sleeve, for assembling elements of a structure, of the type comprising: a collar capable of coming into contact with a front face of the structure, a tightening zone having an outer diameter capable of being inserted into a hole of the structure, a deformation zone adjacent to the tightening zone and capable of forming a bulge between a rear face of the structure, opposite the front face, and a tapped portion adjacent to the deformation zone.

Blind fastenings are fastenings that are installed through structures via a single side, commonly called front face, with the opposite side, called rear face or blind side, being inaccessible. These fastenings are used, for example, in the assembly of aircraft structures.

Document FR 2515283 discloses nuts for blind fastenings of the aforementioned type, as well as rivets for blind fastenings comprising such a nut associated with a screw. Rivets for blind fastenings of the "pull-screw" type are also known from document FR 3016417. A rivet of this type is installed by pulling on the screw in order to create a bulge on the rear side, then by screwing the screw into the nut, the two steps being performed while keeping the collar of the nut in contact with the front side of the structure.

Sometimes, when screwing the screw into the nut, said nut is set into rotation by the screw, for example, in the case of installations, called wet installations, where sealant is applied in the hole. In this case, the rivet cannot be installed since the nut is set into rotation before the screw has been fully inserted into the nut.

In document FR 2515283, a portion of the nut comprises longitudinal splines formed on its outer surface. The diameter of said splines is greater than the diameter of the non-splined portion of the nut. Therefore, when the nut is inserted into a hole of the structure to be assembled, the splines penetrate while interfering with the wall of said hole in order to rotationally immobilize the nut.

However, when the structure comprises an element made of composite material, the presence of splines forcibly penetrating the wall of the hole results in delamination problems. Similarly, when one of the elements of the structure is made of metal, said splines can scratch the material and increase the risk of crack initiation. A requirement therefore exists for an anti-rotation means for the nut that allows these disadvantages to be avoided.

The subject matter of the present invention is to overcome this problem. To this end, the subject matter of the invention is a nut, which may also be considered a tapped sleeve or tubular nut, commonly referred to herein as a nut, of the aforementioned type, comprising grooving on an outer circumference of at least one part of the deformation zone, a maximum diameter of said nut in the area of the grooving being less than or equal to the outer diameter of the tightening zone. Grooving can also take the form of ridges separated by intermediate spaces.

As will be described hereafter, such a nut is capable of being installed in the structure while maintaining the integrity of said structure and while being rotationally blocked or secured under the expected operating torques.

According to other advantageous aspects of the invention, the nut comprises one or more of the following features, taken individually or according to all the possible technical combinations:

the grooving extends over the entire outer circumference of a transverse section of the nut in the form of ridges, a radial pitch between two consecutive ridges being less than or equal to 0.25 mm and preferably being between 0.04 mm and 0.25 mm. As used herein, "radial pitch" means the closest approach of a first ridge to a next adjacent second ridge at any selected point along the second ridge, in other words the length of a straight line perpendicular or normal to the first and second ridges;

grooving formed from non-parallel ridges, or from random ridge and valley or random hill and valley formations, provides a grooving density of at least four ridges or hills per millimeter, and preferably between 4 and 25 ridges or hills per millimeter;

a radial depth of the ridges is between 0.6% and 2% of the outer diameter of the nut;

the ridges extend parallel to an axis of rotation of the nut;

the ridges extend helically about an axis of rotation of the nut;

the grooving has a substantially sinusoidal section;

the nut comprises at least one outer surface that is passivated or covered with a coating selected from among a lubricating coating, an anti-corrosion coating and an aluminum coating;

the grooving is obtained by deformation of the material, by machining, by electro-erosion or by laser ablation.

The invention further relates to a rivet comprising: a screw comprising a threaded portion, a shaft and a head; and a nut as described above, the tightening zone of the nut being capable of receiving the shaft of the screw, the tapped portion of said blind nut being capable of cooperating with the threaded portion of the screw.

According to other advantageous aspects of the invention, the rivet comprises one or more of the following features, taken individually or according to all the possible technical combinations:

the shaft of the screw is cylindrical and has a constant outer diameter;

the shaft of the screw comprises a first and a second portion, respectively having a first and a second outer diameter, said second diameter being less than the first diameter.

The invention further relates to an assembly comprising: at least one structure comprising a front face and an opposite rear face, a hole through each of said surfaces, and a nut as described above, said assembly being capable of being disposed in an installed configuration, in which: the collar of the nut is in contact with the front face; the deformation zone of the nut forms an outer bulge in contact with the rear face; and the grooving comes into contact with the rear face and an edge forming an intersection between the hole and said rear face.

According to other advantageous aspects of the invention, the assembly comprises one or more of the following features, taken individually or according to all the possible technical combinations:

in an initial configuration, before deformation in the form of an outer bulge of the deformation zone, a maximum diameter of the grooving is less than a minimum diameter of the hole;

the rear face comprises a paint coating, the thickness of which is greater than the depth of the ridges;

the assembly further comprises a screw comprising a threaded portion and a head, such that, in the installed configuration, the head is in contact with the collar of the nut and the threaded portion cooperates with the tapped portion of the nut.

The invention will be better understood upon reading the following description, which is provided solely by way of a non-limiting example, and with reference to the drawings, in which.

An embodiment of a blind nut used with a screw to form a blind rivet is described hereafter solely by way of an example. Throughout the remainder of the description, a "blind nut" or "blind rivet" is understood to be a nut or a rivet capable of being included in a blind fastening as previously defined.

Figure 1:
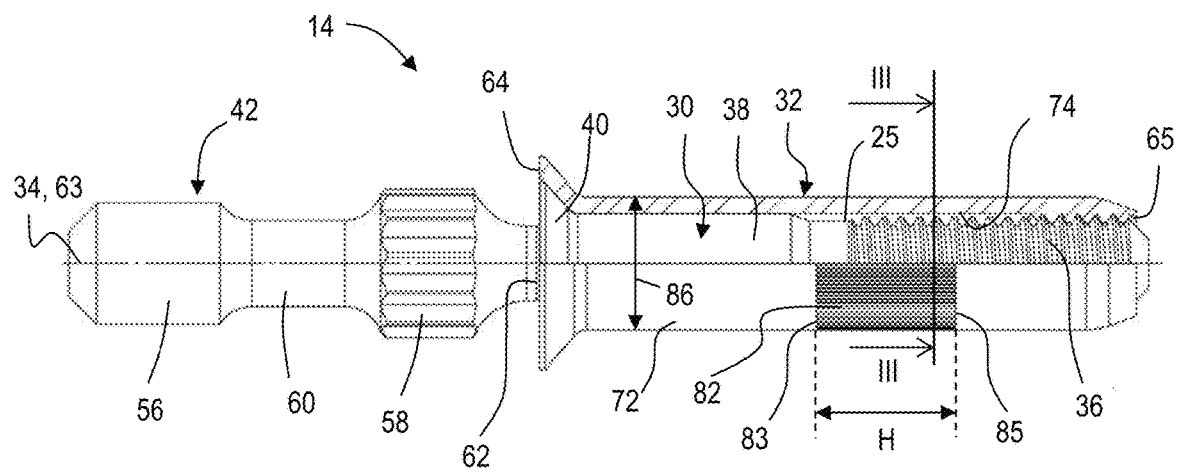
FIG. 1 is a side, partial section view of a rivet according to one embodiment of the invention, in an initial configuration.
Figure 2:
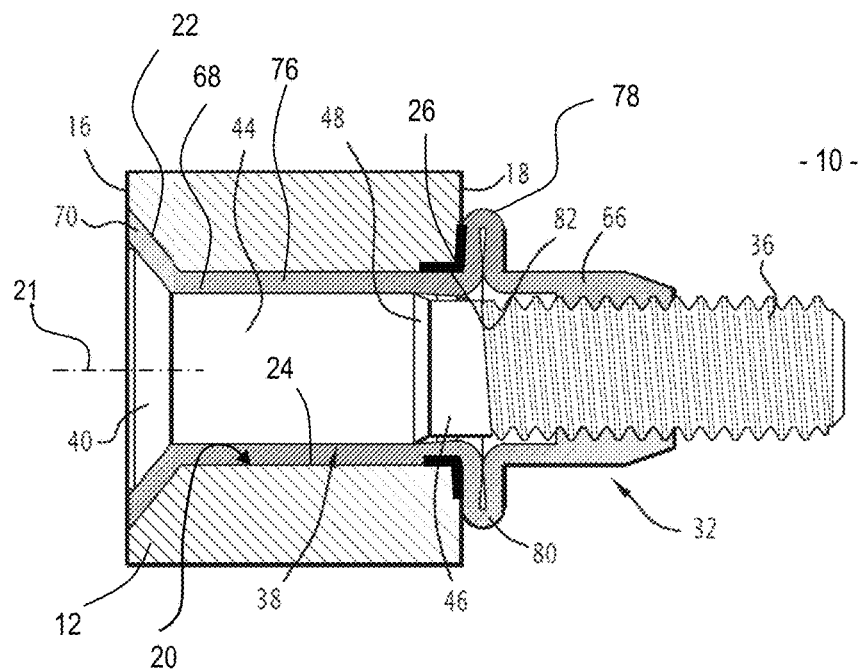
FIG. 2 is a section view of an assembly comprising the rivet of FIG. 1 in an installed configuration.

FIG. 1 shows a rivet 14 comprising a blind nut 32 according to one embodiment of the invention, in a non-installed configuration or an initial configuration. FIG. 2 shows an assembly 10 in an installed configuration, comprising the rivet 14 installed in a structure 12.

The structure 12 comprises a first face 16 and a second face 18, opposite the first face 16. By convention, throughout the remainder of the description, the first face 16 of the structure 12 is called front face, whereas the second face 18 is called rear face.

The front 16 and rear 18 faces are, in this example, substantially flat and parallel to each other. By way of a variant, not shown, the front 16 and rear 18 faces form a non-zero angle, for example, less than 7°. Preferably, the front 16 and rear 18 faces belong to at least two distinct elements. Said elements are metal or made of composite materials, for example. In order to simplify the drawings, a single structure element is shown in FIG. 2.

Preferably, the rear face 18 is covered with a layer of coating of the paint type. In general, the surfaces of the structures used in the aeronautics industry are often coated with a paint coating as anti-corrosion protection or as protection against attacks from chemical products.

The structure 12 comprises a hole 20 through each of the front 16 and rear 18 faces. The hole 20 is preferably disposed along a first axis 21 substantially perpendicular to the front face 16. In the example of FIG. 2, the axis 21 of the hole is also perpendicular to the rear face 18. By way of a variant, not shown, the rear face 18 forms a non-zero angle, for example, less than 7°, with a plane perpendicular to the axis 21 of the hole.

The hole 20 comprises a countersink 22, adjacent to the front face 16, and a cylindrical wall 24, adjacent to the countersunk surface and extending up to the rear face 18. A substantially circular edge 26 forms the intersection between the wall 24 and the rear face 18.

The rivet 14 is capable of rigidly connecting together the elements forming the structure 12. As shown in FIG. 1, the rivet comprises a screw 30 and a blind nut 32, intended to be assembled in the hole 20 to form the assembly 10 of FIG. 2. Preferably, the screw 30 and the nut 32 are metal, for example, made of stainless steel or titanium alloy.

The screw 30 comprises a threaded portion 36, a shaft 38 and a head 40, aligned along a second axis 34. The screw 30 further comprises a gripping element 42, adjacent to the head 40. In the embodiment of FIGS. 1 and 2, the head 40 is a countersunk head intended to be flush with the front face 16.

In this example, the shaft 38 of the screw comprises a first portion 44 and a second portion 46 connected via a connection section 48. Each of the portions 44 and 46 has a substantially rotationally cylindrical shape disposed along the axis 34.

By way of a variant, the shaft of the screw has a substantially rotationally cylindrical shape with a constant diameter.

The rivet 14 has a maximum tightening height capacity $G_{max}$ and a minimum tightening height capacity $G_{min}$, which respectively correspond to the maximum thickness and to the minimum thickness of the structure 12 that the rivet 14 can assemble. In the embodiment of FIG. 2, the thickness of the structure 12 along the first axis 21 is between $G_{min}$ and $G_{max}$.

The gripping element 42 of the screw 30 is capable of cooperating with an installation tool for automated or manual installation of the rivet 14. The gripping element 42 comprises, for example, a first gripping portion 56 and a second gripping portion 58 connected via a blocking portion 60. The first 56 and second 58 gripping portions and the blocking portion 60 are respectively intended to guide the introduction of the rivet 14 into an installation tool, to transfer a torsion torque and to limit an axial movement of the rivet in the installation tool. A rivet comprising such a gripping element, as well as its cooperation with an installation tool, are particularly disclosed in document FR 3016417.

By way of a variant, the rivet can comprise other shapes for the gripping element, allowing the pulling and the rotation of the screw 30.

The gripping element 42 is connected to the head 40 by a shear groove 62. The groove is configured so as to withstand a certain amount of tensile stress along the second axis 34, and to yield beyond a certain torsional stress threshold.

The rivet 14 comprises a blind nut 32 according to one embodiment of the invention. The nut 32 is of tubular shape, disposed along a third axis of rotation 63 and is open at a first 64 and a second 65 end. The nut 32 comprises a tubular body 68 and a flared collar 70 aligned along the third axis 63.

The collar 70, adjacent to the first end 64, is capable of receiving the head 40 of the screw 30. The collar 70 radially projects relative to the tubular body 68.

In the embodiment of FIGS. 1 and 2, the collar 70 has a substantially truncated shape, matching the countersunk head 40 and the countersink 22 of the structure 12. By way of a variant, the collar 70 flares out substantially perpendicular to the third axis 63 and the structure 12 is devoid of a countersink.

Preferably, the first end 64 is formed by a flat surface, without any hollows or relief, of the countersunk or projecting collar 70.

The tubular body 68 of the nut has an outer surface 72. In the initial configuration of FIG. 1, said outer surface 72 is of substantially rotationally cylindrical shape about the third axis 63. Preferably, a maximum outer diameter 86 of the tubular body 68 is slightly less than the diameter of the hole 20, so as to provide a positive clearance between said surfaces.

The tubular body 68 comprises a tightening zone 76, a deformation zone 78 and a tapped portion 66 aligned along the third axis 63. The tightening zone 76, adjacent to the collar 70, is particularly capable of receiving the shaft 38 of the screw 30 and of being disposed in the hole 20 of the structure 12. The tapped portion 66, adjacent to the second end 65, is capable of cooperating with the threaded portion 36 of the screw 30.

Figure 4:
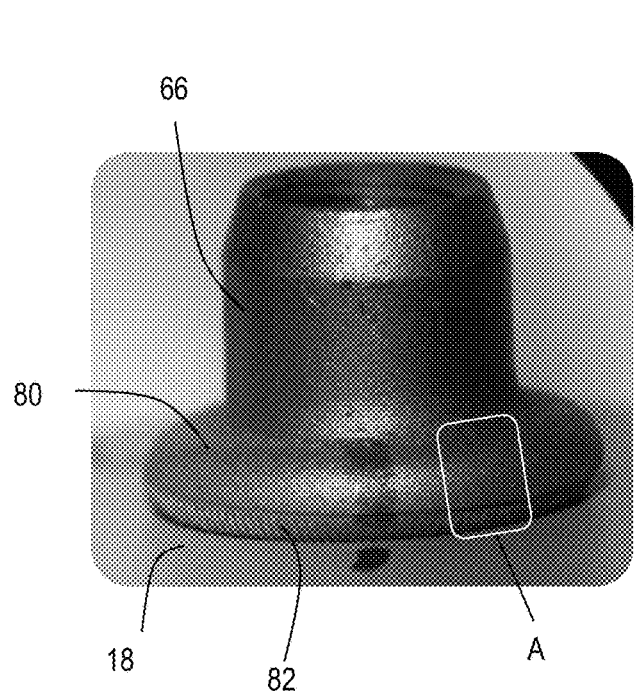
FIG. 4 is an image of an assembly similar to the assembly of FIG. 2.

The deformation zone 78, between the tightening zone 76 and the tapped portion 66, is capable of forming an outer bulge 80 in contact with the rear face 18 of the structure 12, particularly in the installed configuration of FIGS. 2 and 4.

In the embodiment shown, the tightening zone 76 and the deformation zone 78 form a continuous internal surface 74 of cylindrical shape; the deformation zone 78 exhibits lower elastic resistance than the elastic resistance of the remainder of the blind nut 32. This low elastic resistance is, for example, obtained by selectively annealing the deformation zone 78 by means of an induction machine.

By way of a variant, not shown, the thickness of the deformation zone 78 is less than that of the tightening zone 76.

Figure 3:
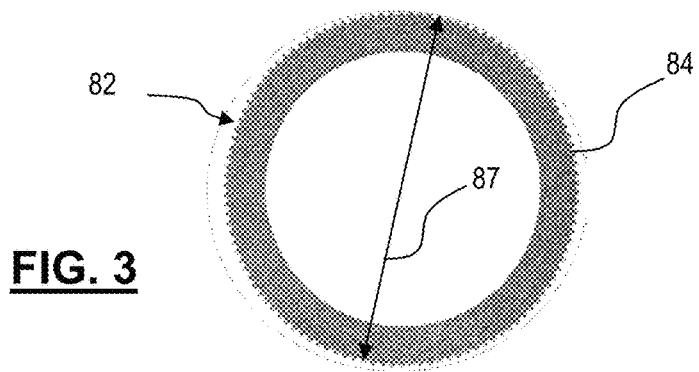
FIG. 3 is a section view along the section line III-III of FIG. 1.

Basically, at the deformation zone 78, the outer surface 72 of the tubular body 68 comprises grooving 82. As shown in FIG. 3, said grooving 82 is distributed over the entire outer circumference of the nut 32. Along the third axis 63, the grooving extends over a length H such that, in the installed configuration of the assembly 10, said grooving is in contact with the rear face 18 of the structure 12 and with the circular edge 26 of the hole 20. Depending on the thickness of the structure 12, in the installed configuration, part of the grooving 82 may or may not extend into the hole 20.

According to one embodiment, a first axial end 83 of the grooving, close to the collar 70, is substantially disposed at a junction between the tightening zone 76 and the deformation zone 78. By way of a variant, the first end 83 and part of the grooving 82 are disposed on the tightening zone 76.

Preferably, a second axial end 85 of the grooving is disposed on the deformation zone 78. By way of a variant, said second end is disposed on the tapped portion 66.

In this example, the grooving 82 comprises a multitude of substantially rectilinear ridges 84, extending in the direction of the third axis 63. In another example, not shown, the grooving comprises a plurality of ridges extending as helices substantially parallel to each other, winding around the third axis 63. In another example, not shown, the grooving comprises two series of ridges extending as helices, the helices of the same series being substantially parallel to each other, the two series of helices winding in the opposite direction around the third axis 63 in order to form a diamond pattern. Other grooving configurations are also possible, whether uniform, for example with knurling or other patterns of ridges or hills and valleys, whether continuous or discontinuous, or random distributions of ridges or hills and valleys.

The maximum outer diameter 87 of the ridges 84 (FIG. 3) is less than or equal to the maximum outer diameter 86 of the tubular body 68, measured at the tightening zone 76, for example. Therefore, the ridges 84 do not interfere with the wall 24 of the hole 20 when the rivet is inserted into the hole.

The applicant has discovered that, in the installed configuration, the anti-rotation of the nut 32 is provided by grooving 82 disposed on the outer surface of the bulge 80 in contact with the rear face 18 of the structure 12, said grooving extending at least opposite the edge 26 of the hole 20. The grooving 82 does not need to extend inside the hole 20. Indeed, during the pulling step for forming the bulge 80, the grooving 82 deforms radially outwards and is axially imposed in the rear face 18 of the structure. At the same time, a portion of the nut 32 disposed opposite the edge 26 deforms very slightly in the radial direction, so that the grooving comes into contact with the edge 26 of the hole 20.

In order for the grooving to come into contact with the rear face and the edge 26, irrespective of the thickness of the structure 12 that the blind nut 32 or the blind rivet 14 can tighten, the first axial end 83 of the grooving 82 is spaced apart from the collar 70 by a distance that is less than or equal to the minimum tightening height capacity $G_{min}$ of the blind nut. Similarly, the second axial end 85 of the grooving is spaced apart from the collar 70 by a distance that is greater than or equal to the maximum tightening height capacity $G_{max}$, plus a length equivalent to (n−1)/2 times the diameter of the hole 20, with "n" corresponding to the ratio between the diameter of the formed bulge 80 and the diameter of the hole 20.

For example, a blind rivet 14 disclosed in document FR 3016417 A1, with a diameter of 6.32 mm, is intended to be inserted into a hole 20 with a nominal diameter of 6.35 mm (⁸⁄₃₂") and with a "grip 8" grip size. More specifically, such a rivet is designed to assemble a structure 12 with a nominal thickness of 12.70 mm (⁸⁄₁₆"); said rivet has a minimum tightening height capacity $G_{min}$ of 10.914 mm, measured from the collar 70, and a maximum tightening height capacity $G_{max}$ of 12.898 mm. The blind rivet 14 also can be deformed so that the bulge has a diameter equal to 1.5 times the nominal diameter of the hole 20.

Therefore, the grooving extends over a length H beginning before $G_{min}$, for example, 10 mm from the collar 70, up to at least [$G_{max}$+((1.5−1)/2×6.35)]=14.48 mm, for example, 15 mm from the collar 70.

When the hole comprises a sealant, or a lubricating surface, it is preferable that the grooving 82 comprises a large number of ridges 84, disposed on the circumference of the nut 32 with a very low radial pitch 88. The radial pitch 88 is shown on the microscope view of FIG. 6.

Preferably, the radial pitch 88 is less than or equal to 0.25 mm. The radial pitch in theory is measured along an arc of a circle; however, the low value of the pitch 88 relative to the diameter 86 of the nut allows, for the sake of simplification, said pitch to be measured in a rectilinear manner, in other words, the circular piece was cut along one ridge and the piece flattened out to be planar and the distance between adjacent ridges measured.

Over the entire circumference of the nut 32, the radial pitch 88 is not necessarily constant. Preferably, over the entire circumference of the nut 32, the radial pitch 88 between two consecutive ridges 84 is between 0.04 mm and 0.25 mm and, more preferably, between 0.07 mm and 0.15 mm.

According to one embodiment, a rule for calculating the number of ridges is to divide the outer circumference of the nut, which is measured, for example, in the tightening zone, by a radial pitch 88 between 0.04 mm and 0.25 mm. Therefore, for a blind nut 32 with a nominal diameter of ⁶⁄₃₂" (4.76 mm), that is a circumference of 14.95 mm (π×4.76 mm), the grooving must comprise between 60 and 374 ridges. As previously stated, these ridges can be disposed longitudinally, i.e. parallel to the axis of rotation 63, or as parallel helices, or can be crossed around the third axis 63.

In the foregoing example of a radial pitch between 0.04 mm and 0.25 mm, the number of ridge and valley combinations distributed around a perimeter of the nut 32 produces a grooving density or in the illustrated example a ridge density. The ridge density can be represented by a number of ridges per unit length, for example the number of ridges per millimeter. In the foregoing example of a radial pitch between 0.04 mm and 0.25 mm, the ridge density can be estimated to be about 25 ridges per millimeter to about four ridges per millimeter. The ridge density is also the inverse of the radial pitch, either of which can be used as an indication of desirable rotational blocking. With a ridge density of between 4-25 ridges per millimeter, measured perpendicular to a selected ridge, rotational blocking of such a nut can occur. According to one embodiment, in which the ridges 84 extend parallel to the axis of rotation 63, there will be between 4-25 ridges per millimeter measured at a given cross-section perpendicular to the axis of rotation 63. In other embodiments, for example where two or more ridges are disposed as parallel helices, the ridge density can be taken in a plane perpendicular to the two or more ridges. In other embodiments, for example where two or more ridges are nonparallel, a ridge density can be taken in a plane approximately perpendicular to a majority of the ridges, or perpendicular to the axis of rotation 63, to approximate a ridge density. In an embodiment such as with knurling or other pattern, the grooving density can be taken based on a plane perpendicular to the axis of rotation 63, or a plane perpendicular to an axis of symmetry. In an embodiment with a random grooving, the grooving density can be taken based on a plane perpendicular to the axis of rotation 63.

The grooving that is obtained increases the rotational blocking, particularly when the blind nut 32 or the rivet 12 is installed by wet installation. The grooving also allows the sealant to flow radially away from the bearing surface of the bulge 80 during the formation of said bulge.

In a transverse section, the ridges 84 can adopt various shapes. A preferred shape involves ridges with a section having a substantially sinusoidal shape. Another preferred shape is a saw-tooth shape, with sharp tips, disposed in the opposite direction of rotation of the screw.

Preferably, a depth 90 for the ridges 84 (FIG. 6), measured radially relative to the third axis 63, is between 0.6% and 2% of the maximum outer diameter 86 of the blind nut. Below this limit, the ridges may not be pronounced enough to prevent the rotation, particularly for a wet installation. An excessive depth also can weaken the mechanical resistance of the nut.

The grooving can be obtained by machining, by laser ablation, by electro-erosion or by deformation of the material. Depending on the selected forming or shaping method and on the material, the final shape of the ridges may not be completely uniform from one ridge to the next, and the profiles of the ridges may differ locally from the nominal shape by a few microns.

After the formation of the grooving, the outer surface 72 of the blind nut 32 can be coated with an anti-corrosion coating of the HI-KOTE™ type produced by Hi-Shear, or with a lubricating coating or with an aluminum coating or even can be passivated.

A method for installing the blind rivet 14 in a structure 12, for forming the assembly 10, will now be described.

Firstly, the screw 30 and the blind nut 32 are assembled to form the rivet 14. More specifically, the threaded portion 36 of the screw 30 is screwed into the tapped portion 66 of the blind nut 32, until the head 40 of the screw comes into abutment against the collar 70. The blind rivet 14, in the initial configuration of FIG. 1, is thus formed.

The following steps are performed, for example, using an installation tool engaged with the handling element 42 of the screw 30, in a similar manner to the method disclosed in document FR 3016417.

The blind rivet 14 in the initial configuration is introduced into the hole 20 from the front face 16 of the structure 12. The blind rivet 14 is moved until it comes into abutment with the collar 70 of the blind nut 32 against the countersink 22 of the hole.

The free end 64 of the collar 70 of the nut 32, as well as the shear groove 62 of the screw 30, are flush with the front face 16 of the structure 12. The tapped portion 66 of the nut 32 and the threaded portion 36 of the screw 30 form a projection outside the structure 12, on the rear face 18.

The blind nut 32 is then held in place in the hole 20 by exerting an axial thrust against the flat surface formed by the end 64 of the collar 70. At the same time, an axial pulling force is exerted on the screw 30, which causes plastic deformation of the deformation zone 78. Said plastic deformation results in the outer bulge 80 formed against the rear face 18. The grooving on the deformation portion 78 deforms radially outwards and is axially imposed in the rear face 18 and comes into contact with the circular edge 26 of the hole 20 of the structure 12.

During the next step, the gripping element 42 is set into rotation in order to screw the threaded portion 36 of the screw 30 into the tapped portion 66 of the blind nut 32, until the head 40 of the screw comes into abutment against the collar 70, then a torsion force is exerted on the gripping element 42 so as to break the screw 30 at the shear groove 62. The grooving 82 blocks the rotation of the blind nut during this step.

The assembly 10 is then in the installed configuration, shown in FIG. 2 without the gripping element 42. The outer bulge 80 and the second face 18, on the one hand, and the collar 70 and the countersink 22, on the other hand, form opposite stops that axially block the blind nut 32 in the hole 20.

FIG. 4 is an image of a deformed blind nut 32, in the installed configuration in a structure, represented by a test piece. The grooving 82 can be seen on part of the bulge 80 that is not in abutment against the rear face 18.

Figure 5:
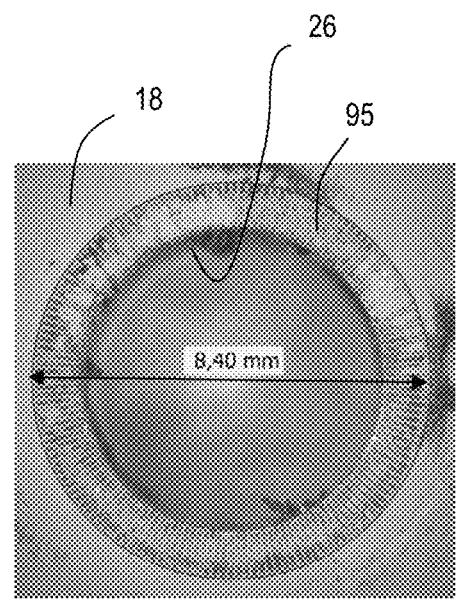
FIG. 5 is an image of an element of the assembly of FIG. 2 after the removal of the rivet.

FIG. 5 shows an image of the rear face 18 of the test piece of FIG. 4 after the removal of the blind nut 32.

Figure 6:
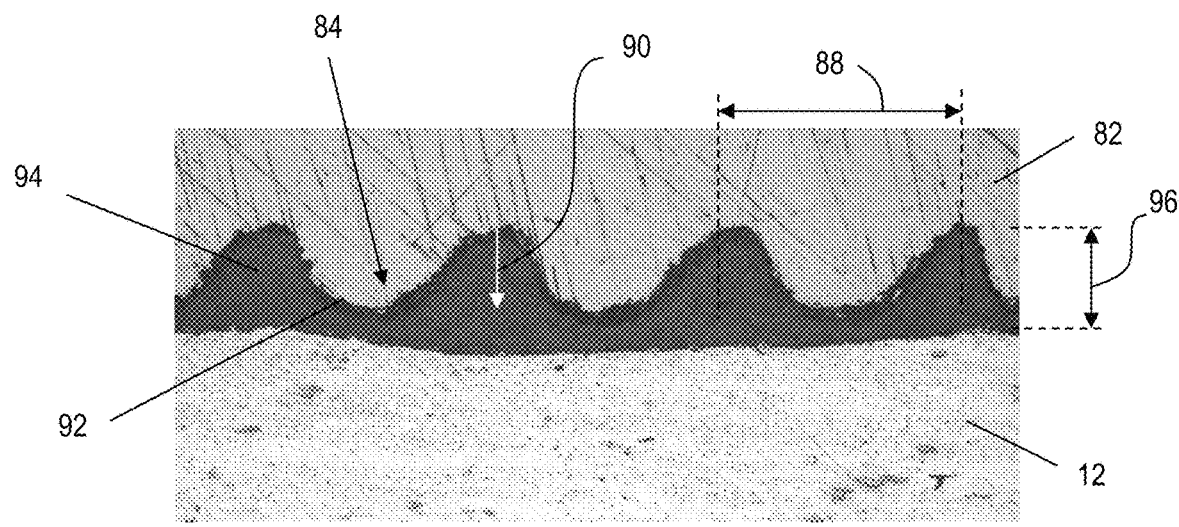
FIG. 6 is a microscope image of a portion of FIG. 4.

FIG. 6 is a microscope view of an axial section of the blind nut 32 of FIG. 4, in the portion A indicated in FIG. 4. FIG. 6 shows a stack formed by the grooving 82 of the nut 32, a thin layer of sealant 92 covering said grooving, a paint coating 94 coating the structure 12, and said structure 12 represented by the test piece.

As can be seen in FIG. 5, the grooving 82 has left an imprint 95 on the rear face 18 of the test piece. As can be seen in FIG. 6, in the installed configuration, the structure 12 is not in contact with the ridges 84.

Indeed, when a thickness 96 of the paint coating 94 is greater than the depth 90 of the ridges, the structure 12 is not reached by the ridges in the installed configuration. However, the friction resulting from the deformation 95 of the paint coating 94 on the rear face 18 is sufficient to block the rotation of the blind nut 32.

The tests have demonstrated that the blind nut 32 according to the invention withstood any rotation, even when torques of up to 15 Nm were applied for a nut with a diameter of 5/32".

Even though in the example shown the blind nut 32 is used with a screw 30 with a specific shape for forming a blind rivet, the blind nut 32 clearly can be used as a standard blind nut, the bulge of which is formed by pulling using a tool comprising a threaded mandrel, of the type disclosed in document FR 2515283. The installed blind nut can then receive a conventional screw, which is installed and removed manually or with a screwdriver.

The invention claimed is:

1. A nut for assembling elements of a structure, said nut comprising:
   a collar capable of coming into contact with a front face of the structure;
   a tightening zone having an outer diameter capable of being inserted into a hole of the structure;
   a deformation zone adjacent to the tightening zone and capable of forming a bulge against a rear face of the structure, opposite the front face; and
   a tapped portion adjacent to the deformation zone;
   the nut being characterized in that it comprises grooving or ridges on an outer circumference of at least one part of the deformation zone, and in that a maximum diameter of said deformation zone having said grooving or ridges is less than or equal to the outer diameter of the tightening zone, and wherein the grooving extends over the entire outer circumference of a transverse section of the nut in the form of ridges, a radial pitch between two consecutive ridges being less than or equal to 0.25 mm.

2. The nut as claimed in claim 1, wherein the grooving radial pitch between two consecutive ridges being between 0.04 mm and 0.25 mm.

3. The nut as claimed in claim 2, wherein a radial depth of the ridges is between 0.6% and 2% of the outer diameter of the nut.

4. The nut as claimed in claim 2, wherein the ridges extend parallel to an axis of rotation of the nut.

5. The nut as claimed in claim 2, wherein the ridges extend helically about an axis of rotation of the nut.

6. The nut as claimed in claim 1, wherein the grooving has a substantially sinusoidal section.

7. The nut as claimed in claim 1, wherein the nut includes a grooving density of between 25 and 4 per millimeter.

8. A rivet comprising: a screw comprising a threaded portion, a shaft and a head; and a nut as claimed in claim 1, the tightening zone of the nut being capable of receiving the shaft of the screw, the tapped portion of said nut being capable of cooperating with the threaded portion of the screw.

9. An assembly comprising:
   at least one structure comprising a front face and an opposite rear face, a hole through each of said surfaces; and
   a nut as claimed in claim 1;
   said assembly being capable of being disposed in an installed configuration, in which:
     the collar of the nut is in contact with the front face;
     the deformation zone of the nut forms an outer bulge in contact with the rear face; and
   the grooving comes into contact with the rear face and an edge forming an intersection between the hole and said rear face.

10. The assembly as claimed in claim 9, such that, in an initial configuration, before deformation in the form of an outer bulge of the deformation zone, a maximum diameter of the grooving is less than a minimum diameter of the hole.

11. The assembly as claimed in claim 9, wherein the ridges of the nut have a depth between 0.6% and 2% of the outer diameter of the nut, wherein the rear face comprises a paint coating, the thickness of which is greater than the depth of the ridges.

12. The assembly as claimed in claim 9, further comprising a screw comprising a threaded portion and a head, such that, in the installed configuration, the head is in contact with the collar of the nut, and the threaded portion cooperates with the tapped portion of the nut.

* * * * *